March 9, 1943.  P. BOILLAT  2,313,613
LATHE
Filed Oct. 24, 1940
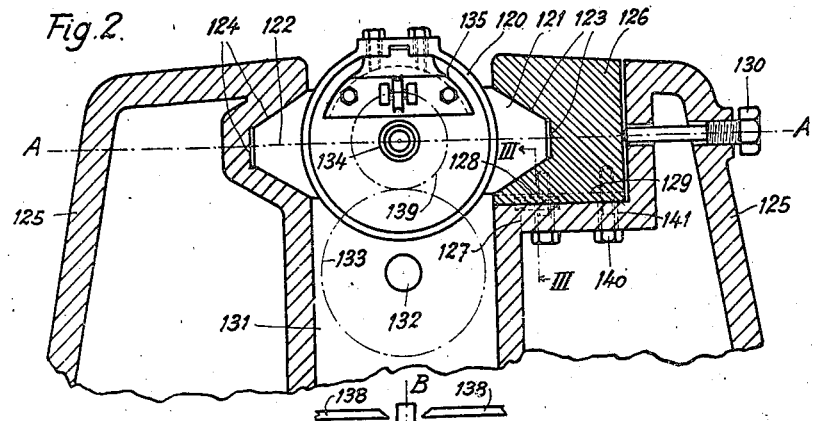
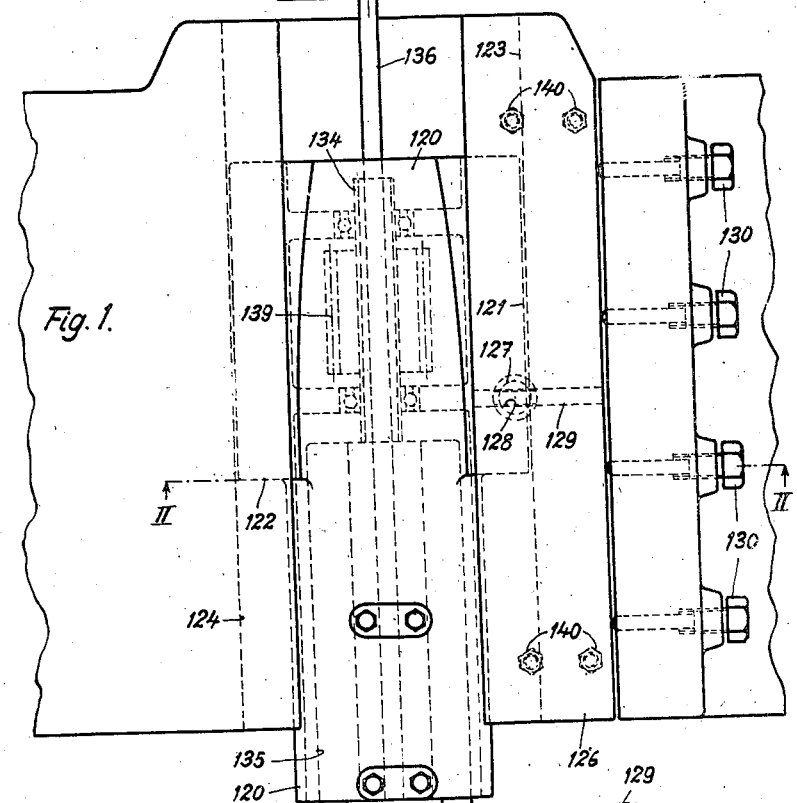

Patented Mar. 9, 1943

2,313,613

UNITED STATES PATENT OFFICE 2,313,613

LATHE

Philippe Boillat, Tavannes, Switzerland, assignor to the firm Tavannes Machines Co. S. A., Tavannes, Switzerland, a joint-stock company of Switzerland Application October 24, 1940, Serial No. 362,662 In Great Britain October 30, 1939

2 Claims. (Cl. 82—28)

This invention relates to lathes. In the lathes of known types the head stock whose base slides in a guide, preferably in a dovetailed groove of the frame, often tends to jam in said guide.

The present invention provides a guide which prevents any jamming and, besides, prevents various other advantages.

An object of the invention is to provide lateral slide members on the head stock, adapted to engage guide channels on the frame so as to allow said slide members to slide on said guide channels.

Further objects are to give these slide members and guide channels V-shaped cross sections, and to dispose one of these guide channels on a guide member adjustably mounted on said frame in order to allow of the adjustment of the play between the cooperating guide channels and slide members.

Another object is to attach the slide members to the head stock in such a way that the common symmetry axis of the cross sections of the slide members intersects the axis of the spindle on said head stock.

The invention allows the shaft, driving the spindle, to be located immediately under the head stock. Furthermore this arrangement facilitates the construction of the drive of the clamping device for the work piece.

If applicant's arrangement of radially working tools on a slidably and pivotally mounted sector be made use of (as is shown in my copending application Serial No. 362,665, filed October 24, 1940) these tools always lie and advance in a horizontal axis forming the symmetry axis of the V-shaped guides. Owing to this no bending moments, but only compressive forces coming from said radially working tools, are transmitted to the guides.

Other objects and features of the invention will be apparent as the following description proceeds, reference being had to the accompanying drawing, in which Fig. 1 is a plan view of the head stock and of a part of the frame of the lathe.

Fig. 2 is partly a front view of the head stock and partly a section of the frame taken on line II—II of Fig. 1.

Fig. 3 is a section taken on line III—III of Fig. 2.

The head stock 120 has two laterally projecting slide members 121, 122. These latter are, in this embodiment, made in one piece with the head stock, i. e., they are cast-on to the head stock. It is understood that these slide members 121, 122 could also be fixed to the head stock in any other suitable way, e. g. by means of screw bolts or by dovetailing. As is seen from Fig. 1 the slide members 121, 122 extend over about half the length of the head stock only. The members could, however, be longer, for instance, almost as long as the head stock, or even several shorter slide members might be provided on each side. The slide members have a V-shaped cross section and engage, with allowance for sliding, the guide channels 123, 124 with a corresponding V-shaped cross section. Both slide members have a common horizontal symmetry axis A—A (Fig. 2) intersecting the axis B—B of the spindle 134 on the head stock. The head stock is only shown as far as is necessary for the comprehension of the invention. It may be constructed as a hollow body in any usual manner, e. g. provided with a special frame 135 carrying the clamping device (not shown in the drawing) for the work piece 136 and may be reciprocated in any usual way; for instance, by means of cam disks, levers and a chain, not shown, as is illustrated in one of my copending applications. Channel 124 is provided directly on the frame 125 of the lathe, while channel 123 is grooved in an adjustable guide member 126 mounted on the frame with allowance for sliding in the direction of the symmetry axis A—A. For this purpose a pin 127 is fixed to the frame, possessing a square head 128 entering a groove 129 milled in the member 126. With the aid of the screws 130 the guide member 126 can be adjusted so as to alter the play of the guide. When the play is adjusted guide member 126 is screwed tight, by means of the bolts 140 going, with sufficient radial play, through holes 141 of the frame.

From the illustration of this embodiment the advantages named in the preface may be clearly seen: The bearing surfaces of the headstock are very large so that jamming is impossible. For the same reason the compressive forces arising partly from the lateral tools 138 in the direction of line A—A and partly from the turning moments of the tools are distributed over these large surfaces, so that the pressure per unit of surface is very small. The space 131 under the head stock 120 allows of the provision of the driving shaft 132 for the spindle 134 immediately under the head-stock. This shaft carries gear wheel 133 meshing another gear wheel 139 mounted on the spindle 134.

Space 131 also gives free access for the mechanism operating the clamping device which fact allows of a very advantageous arrangement of said mechanism forming the object of a copending application.

The cross section of the guides may have any other suitable form, but the V-shape is the most advantageous. In any case it is understood that the invention is not limited to the embodiment described and illustrated, as various changes may occur to those skilled in the art without departing from the scope of the invention or sacrificing any of its advantages.

What I claim is:

1. In a lathe comprising a frame, a headstock, a headstock spindle, a driving shaft for said headstock spindle, V-shaped guides provided on the sides of said headstock, a guide member mounted on said frame with allowance for sliding in a direction across said headstock, guide channels with V-shaped cross section on said frame and on said guide member, adapted to directly engage said V-shaped guides, said V-shaped guides and said V-shaped guide channels being arranged in such a manner as to provide sufficient space in said frame immediately beneath said headstock to accommodate said driving shaft.

2. In a lathe comprising a frame, a headstock, a headstock spindle, a driving shaft for said headstock spindle, V-shaped guides attached to said headstock in such a way that their common horizontal symmetry axis intersects the axis of said headstock spindle, a guide member mounted on said frame with allowance for sliding in the direction of the common symmetry axis of said V-shaped guides, guide channels with V-shaped cross section on said frame and on said guide member, adapted to directly engage said V-shaped guides, said frame comprising a hollow immediately beneath said headstock to accommodate said driving shaft.

PHILIPPE BOILLAT.